(12) United States Patent
Atkinson

(10) Patent No.: US 12,259,071 B2
(45) Date of Patent: Mar. 25, 2025

(54) SYSTEM AND METHOD FOR MANAGING LINES THAT NEED TO BE ORGANIZED, SORTED, AND RETURNED FOR STORAGE

(71) Applicant: Mary Atkinson, Santa Cruz, CA (US)

(72) Inventor: Mary Atkinson, Santa Cruz, CA (US)

( * ) Notice: Subject to any disclaimer, the term of this patent is extended or adjusted under 35 U.S.C. 154(b) by 0 days.

(21) Appl. No.: 18/669,520

(22) Filed: May 20, 2024

(65) Prior Publication Data

US 2024/0301970 A1  Sep. 12, 2024

Related U.S. Application Data

(62) Division of application No. 18/295,235, filed on Apr. 3, 2023, now Pat. No. 11,988,310.

(60) Provisional application No. 63/362,395, filed on Apr. 2, 2022.

(51) Int. Cl.
*F16L 3/00* (2006.01)
*F16L 3/06* (2006.01)

(52) U.S. Cl.
CPC ..................................... *F16L 3/06* (2013.01)

(58) Field of Classification Search
None
See application file for complete search history.

(56) References Cited

U.S. PATENT DOCUMENTS

| | | | | |
|---|---|---|---|---|
| 8,342,459 B2* | 1/2013 | Garrison | ............... | H01R 12/63 248/68.1 |
| 11,141,563 B2* | 10/2021 | Coatsworth | ............ | A61B 50/20 |
| 2005/0277888 A1* | 12/2005 | Propp | .................. | A61M 25/02 604/174 |
| 2006/0237597 A1* | 10/2006 | D'Andria | ................ | F16L 3/223 248/51 |
| 2008/0087465 A1* | 4/2008 | Anderson | ................ | H02G 3/30 174/72 A |
| 2015/0001351 A1* | 1/2015 | Krager | ..................... | H02G 3/32 248/49 |
| 2017/0281901 A1* | 10/2017 | Otake | ................. | A61M 25/002 |
| 2018/0080579 A1* | 3/2018 | Costigan | .................. | H04Q 1/06 |

* cited by examiner

*Primary Examiner* — Steven M Marsh
(74) *Attorney, Agent, or Firm* — Jubin Dana; Dana Legal Services

(57) ABSTRACT

An apparatus for organizing, untangling, and storing multiple lines. The apparatus prevents tangling of lines and decreases wasted time in organizing, detangling, using, and storing lines. The apparatus includes a stop groove for preventing movement of the apparatus long the multiple lines being managed. The apparatus may also include an indicator for identification of the position of the stop groove.

4 Claims, 4 Drawing Sheets

SYSTEM AND METHOD FOR MANAGING LINES THAT NEED TO BE ORGANIZED, SORTED, AND RETURNED FOR STORAGE

CROSS REFERENCE TO RELATED APPLICATION

This application claims priority to U.S. Non-Provisional application Ser. No. 18/295,235 filed Apr. 3, 2023 which will issue as U.S. Pat. No. 11,988,310 on May 21, 2024, which claims priority to U.S. Provisional Ser. No. 63/362,395 filed on Apr. 2, 2022, the entire disclosure of which is incorporated herein by reference.

TECHNICAL FIELD

The present disclosure relates to an apparatus and, more specifically, to an apparatus for sorting, managing and detangling lines.

BACKGROUND

Current methods of managing numerous lines that originate from a one or more sources are inadequate. As used herein, lines include but are not limited to, ropes, fishing lines, pipes, electrical wires, medical device electrical leads, tubes and steel cables. There is no efficient apparatus for management of multiple lines that originate from a device or single source. For example, lines, such as those used in electrocardiograms, may be numerous and long. While storing and/or using the lines, they can easily become tangled and cause less than optimum usage. In a medical environment, untangling of lines causes time wasted and frustration for both patients and medical staff Wasted time leads to less-than-optimal productivity of scarce medical staff caused by post-pandemic personnel shortages. Wasted time further equates to wasted money due to the need to hire additional staff. Therefore what is needed is an apparatus managing multiple lines to organize and detangle the lines.

SUMMARY

In accordance with some embodiments of the present disclosure, an apparatus for managing multiple lines in order to organize and detangle the lines is shown as a receiving block.

A system for managing lines includes at least one set of receiving blocks; the receiving blocks include a distal block and a proximal block; the distal block and the proximal block each have a respective plurality of parallel, spaced apart, receiving grooves, The plurality of parallel grooves includes a plurality of receiving grooves and a stop groove; wherein each receiving groove is configured to allow the lines to move through each receiving groove along lengths of the lines.

The apparatus includes a receiving stop groove configured to allow the lines to move through each receiving stop groove along the lengths of the lines and further configured to stop movement of the lines through each stop groove when the line engages the stop groove portion.

These and other features, aspects and advantages of the present disclosure will become better understood with reference to the following drawings, description, and claims.

DETAILED DESCRIPTION

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The technical problem to be solved is that multiple lines, which originate from one or more sources, can become tangled and prevent an efficient use of the lines. For example, in the medical environment, after detangling and guiding/organizing the lines, the last/smallest device can be held in the user's hands as any one or more of the lines is removed, attached to a patient, and then returned.

It is noted that, as used herein, the singular forms "a," "an" and "the" include plural referents unless the context clearly dictates otherwise. Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

The following describes various examples of the present technology that illustrate various aspects and embodiments of the invention. Generally, examples can use the described aspects in any combination. The description is not to be taken in a limiting sense, but it is made merely for the purpose of illustrating the general principles of the disclosure, since the scope of the disclosure is best defined by the appended claims. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Figure 1:
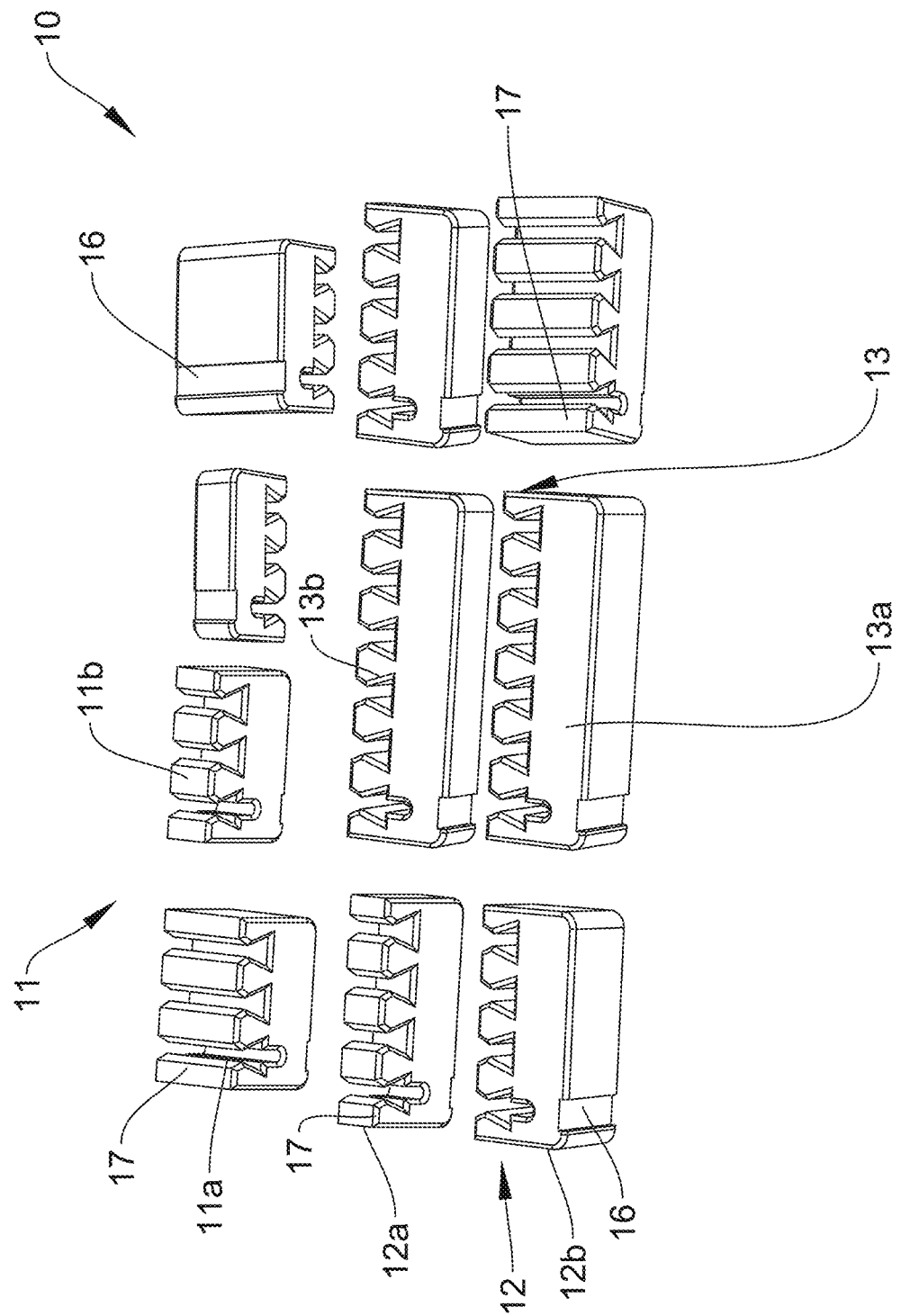
FIG. 1 shows perspective views of various exemplary embodiments of an apparatus according to the present disclosure.
Figure 2:
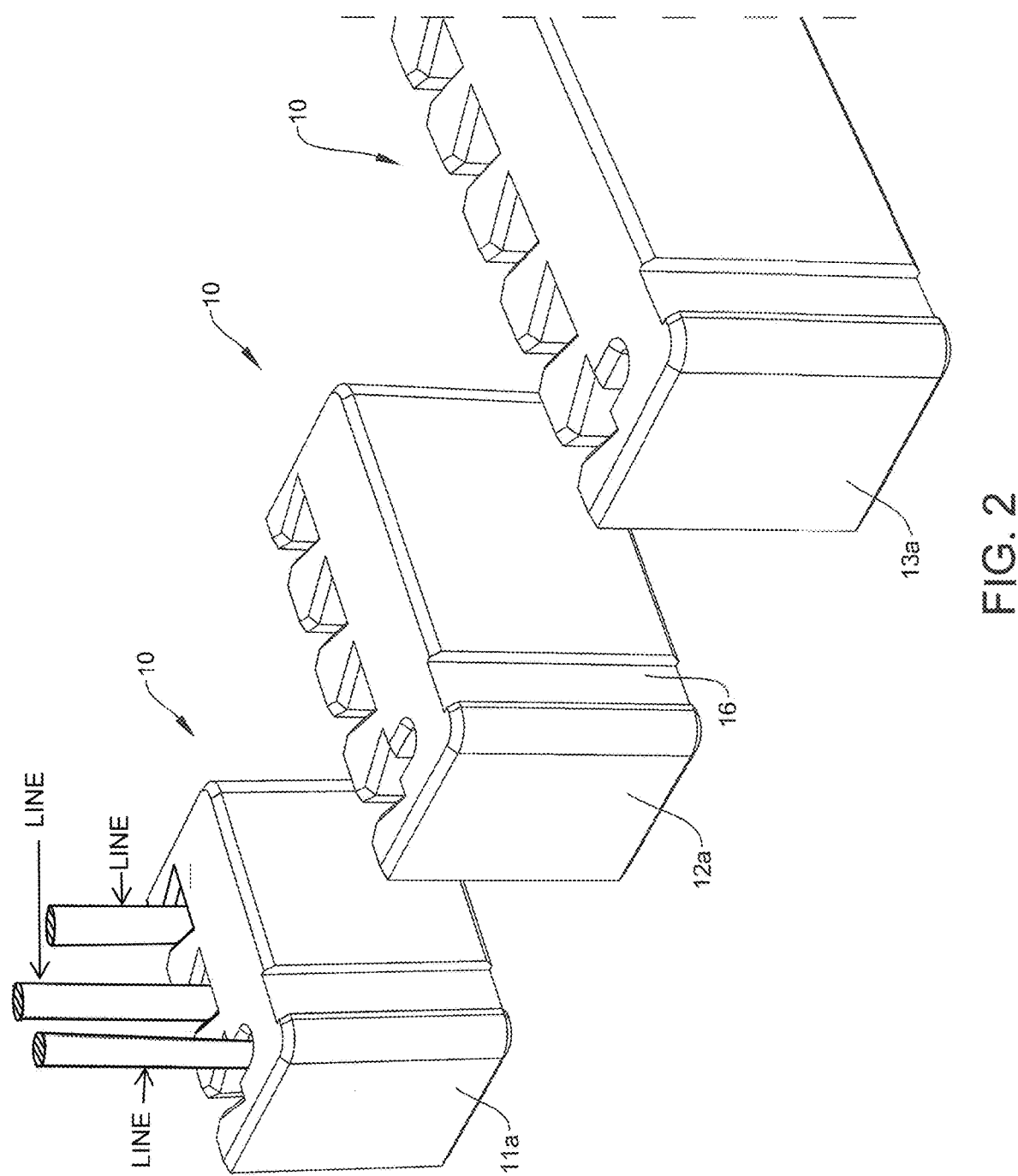
FIG. 2 shows perspective views of various exemplary embodiments of an apparatus according to the present disclosure.

Referring now to FIG. 1 and FIG. 2, a device or an apparatus 10 is shown according to various embodiments of the present disclosure. In accordance with the various aspects and embodiments of the present disclosure, the apparatus 10 is disclosed that solves the foregoing problems by providing one or more sizes and shapes of receiving blocks, such as receiving blocks 11, 12, and 13. In accordance with some embodiments, each receiving block includes a plurality of sliding grooves and at least one groove that includes a stop groove. In accordance with some embodiments, a system includes multiple of apparatus 10, such as a pair of receiving blocks, such as 11a and 11b.

In accordance with some embodiments, the apparatus 10 includes grooves that can receive a plurality of lines while enabling the receiving block to move along the length of each line. This allows the lines to be kept apart and organized in a group while moving the apparatus 10 to a new position.

In accordance with some embodiments, the apparatus 10 includes at least one stop groove. The stop groove can receive a line and thereby lock the receiving block in position to prevent sliding of the receiving block along the length of the line, which prevents sliding along the length of all the lines organized in the receiving block without having to lock each line in place. In accordance with some embodiments, the stop groove can additionally prevent the receiving block from moving when a line is inserted into or engaged into the stop groove. In accordance with some embodiments, A system using the apparatus 10 may include one or more sets of receiving blocks, such as receiving blocks 11a and 11b; 12a and 12b; and 13a and 13b.

In accordance with some embodiments, a system using the apparatus 10 includes any number of sets of receiving blocks, such as three or more sets. In accordance with some embodiments, the system includes a pair of receiving blocks, one distal receiving block and one proximal receiving block. In accordance with some embodiments, the system of receiving blocks 11 includes receiving blocks 11a and 11b, the system of receiving blocks 12 includes receiving blocks 12a and 12b, and system of receiving blocks 13 includes receiving blocks 13a and 13b.

In accordance with some embodiments, a set of receiving blocks have the same number of sliding grooves and are different in size, for example different thickness thereby creating a pair of receiving blocks, which can be visually coordinated using color, one for a proximal end close to the source and one for a distal end further from the source, which can be coordinated and read visually. In accordance with some embodiments, the proximal receiving block is larger than the distal receiving block. In accordance with some embodiments, the proximal receiving block is smaller than the distal receiving block. In accordance with some embodiments, the proximal receiving block can be positioned on the lines closer to a source of the lines when compared to the position of the distal receiving block on those same lines.

Figure 3:
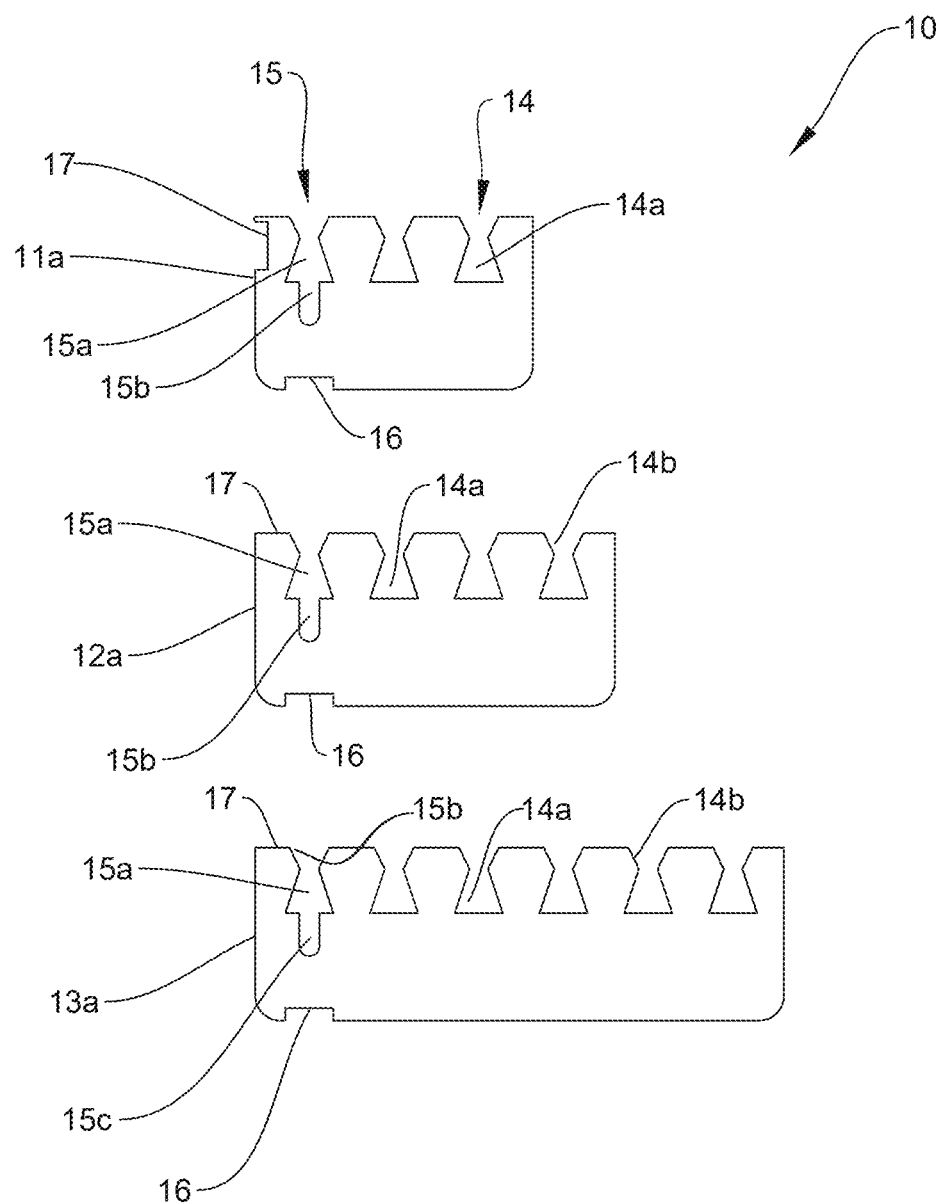
FIG. 3 shows front views of various exemplary embodiments of an apparatus according to the present disclosure.

Referring now to FIG. 3, in accordance with some embodiments, each receiving block can include a plurality of spaced apart receiving grooves 14. In accordance with some embodiments, the receiving grooves are parallel. In accordance with some embodiments, each receiving groove 14 may have an hour-glass type of configuration, wherein an upper opening width is larger than a middle opening width and a lower opening width is about the same or slightly larger than the upper opening width. In accordance with some embodiments, the width of each portion of the receiving groove 14, as discussed below, will vary based on and correspond to the width of the line that the apparatus 10 is being used to manage. In accordance with some embodiments, each receiving groove 14 is configured to allow the lines to move through each receiving groove 14 along lengths of the lines. In accordance with some embodiments, each receiving groove 14 includes a lower sliding portion 14a corresponding to the lower opening width, in which a line can slide. In accordance with some embodiments, the receiving groove 14 includes a receiving portion 14b corresponding to the upper sliding portion, into which a line is passed to be inserted into the receiving groove 14. In accordance with some embodiments, the number of receiving grooves 14 for one receiving block can be equal to the number of lines, which need to be managed, minus one. In accordance with some embodiments, the width of the receiving groove 14 will vary depending on the width of the line. As will be apparent, the scope of the present invention is not limited by the number of receiving grooves or the exact shape/width of the receiving groove.

In accordance with some embodiments, each receiving block can include at least one receiving stop groove 15 that includes a lower slide portion 15a, an upper receiving portion 15b, and a stop groove portion 15c. The receiving stop groove 15 can be parallel to and spaced apart from the receiving grooves 14. In accordance with some embodiments, each receiving stop groove 15 may have an hour-glass type of configuration, which is similar to the receiving grooves 14. In accordance with some embodiments, each receiving stop groove 15 is configured to allow the lines to move through each receiving stop groove 15 along the lengths of the lines and further configured to engage the line in the receiving stop groove 15 and stop movement of the lines through each receiving stop groove 15 and, hence, movement of the receiving block relative to the lines being managed.

In accordance with some embodiments, each receiving stop groove 15 includes the lower slide portion 15a, in and through which a line can slide. In accordance with some embodiments, each receiving stop groove 15 includes the upper receiving portion 15b, using which a line can be inserted into the lower slide portion 15a of the receiving stop groove 15. In accordance with some embodiments, each receiving stop groove 15 includes a stop groove portion 15c. The stop groove portion 15c is configured to be just wide enough to receive and engage a line, which is within the lower slide portion 15a and is pushed down from the lower slide portion 15a into the stop groove portion 15c, when a user wants to prevent the line from sliding through the apparatus 10. In accordance with some embodiments, the width of the receiving stop groove 15 will vary depending on the width of the line. As will be apparent, the scope of the present invention is not limited by the number of receiving stop grooves or the exact shape/width of the receiving stop groove.

In accordance with some embodiments, each apparatus 10 includes lower stop indicator 16 and an upper stop indicator 17, either of which, or both, is a change in the form or shape of the apparatus 10 and detectable by touch or tactile sensation. In accordance with some embodiments, the stop indicators 16 and 17 are positioned, which can be any location proximal to the receiving stop groove 15c, on the apparatus 10 to physically be associated with and indicate the position of the receiving stop groove 15. In accordance with some embodiments, the stop indicators 16 and 17 are physical indicators that are detectable or readable by touch. The shape and form of the stop indicators 16 and 17 can vary and in accordance with the embodiments may be any one or more of: indentations, raised ridges, bumps, or any change in physical texture to indicate the positioning. In accordance with some embodiments, the stop indicators 16 and 17 are color indicators and may be of the same color for a given set of receiving blocks while a different color from the receiving block's color and allow for visual detection of the positioning of the receiving stop groove 15. In accordance with some embodiments, either one or both the stop indicators 16 and 17 include physical changes in form of the apparatus 10 and also color coordinated indicators thereby allowing both tactile/physical and visual detection.

Figure 4:
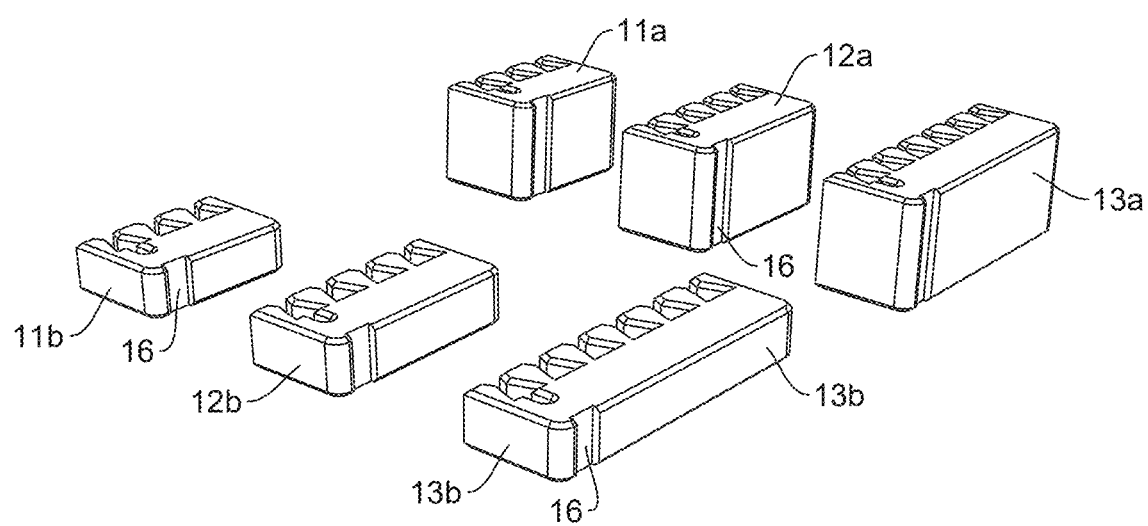
FIG. 4 shows perspective views of various exemplary embodiments of a system having a pair of apparatus according to the present disclosure.

Referring now to FIG. 4 and to the figures in general, in accordance with some embodiments a system is shown that includes a pair of apparatus 10 as a set of receiving blocks, such as receiving blocks 11a/11b, 12a/12b, or 13a/13b. In this non-limiting example, the receiving blocks 11a and 11b receive/engage and organize multiple lines. The receiving block 11a is positioned proximal to the source of the lines and receives multiple lines, one per receiving groove. In accordance with some embodiments, the proximal receiving block selected is the larger block. In accordance with some embodiments, the proximal receiving block selected is the smaller block. The scope of the present invention is not limited by the size of the receiving block selected to the proximal to the source.

The receiving block 11b receives or engages (is attached) to the same set of multiple lines, such that each line is positioned with a corresponding receiving groove position. The lines are in the same order in the receiving block 11b relative to the receiving block 11a. The receiving block 11b is positioned distal relative to the source of the lines. Each of the receiving blocks 11a and 11b can be moved independently along the lengths of the lines before, during, and after use of the lines. Each of the receiving blocks 11a and 11b can be moved independently along the lengths of the lines until one line is positioned into the stop groove of that receiving block, thereby preventing movement of (locking into position) the receiving block.

In accordance with some embodiments, the use of a set of receiving blocks allows for bundling and easy management of a set of lines. As the set of lines are bundled together at the source using one receiving block, then use of the matching (color coordinated or geometric shape coordinated or number coordinated) receiving block at the distal end of the line, which may be several feet from the proximal end of the line near the source, allows for the user to easily detect matching line bundles and organized the lines between origination at the source and application at the distal end.

When the lines need to be returned or stored (not in use), then the receiving block can be stored on one line, while the other lines are removed from the receiving block. This allows for long term storage of the receiving blocks on the lines while preventing loss of the receiving block and keeping the receiving block stored with the lines at the source of the lines.

In a medical environment, the present disclosure provides ease of use and proficiency of the EKG technician allowing for more efficient use of time. The invention can reduce stress and potentially save lives. The present disclosure can untangle and straighten lines by managing, organizing, and bundling them; organizing them in their respective order; maintaining that order yet allowing the apparatus to be moved along the line and the lines removed, applied to a patient, and returned in order. The present disclosure can be color coordinated with sensory clues that aid in ease of identification and handling. The present disclosure can also be sized to accommodate all hand sizes and can be potentially used by one hand. Technicians can combine devices of the present disclosure according to the number of lines and length of lines and according to left- or right-hand preference. The present disclosure may never be entirely removed from the lines; this cannot be lost or misplaced if used according to instructions.

Certain examples have been described herein and it will be noted that different combinations of different components from different examples may be possible. Salient features are presented to better explain examples; however, it is clear that certain features may be added, modified and/or omitted without modifying the functional aspects of these examples as described.

It should be understood, of course, that the foregoing relates to exemplary embodiments of the invention and that modifications may be made without departing from the scope of the invention. The scope of the invention, therefore, is not intended to be limited to the exemplary embodiments shown and described herein. Rather, the scope and spirit of present invention is embodied by the appended claims

What is claimed is:

1. A system for coordinating lines, the system comprising:
a first receiving block including a first plurality of receiving grooves and a first receiving stop groove, wherein each of the first plurality of receiving grooves and the first receiving stop groove has a line inserted therein; and
a second receiving block including a second plurality of receiving grooves and a second receiving stop groove, wherein each of the second plurality of receiving grooves and the least one second receiving stop groove has a line inserted therein,
wherein each receiving groove is configured to allow the lines to move through each receiving groove along a length of the lines,
wherein each receiving stop groove is configured to allow the lines to move through each receiving stop groove along the length of the lines and further configured to stop movement of the lines when the line in the receiving stop groove engages a stop groove portion of the receiving stop groove.

2. The apparatus of claim 1, wherein each receiving block includes an indicator positioned adjacent to the receiving stop groove.

3. The apparatus of claim 2, wherein the indicator is on the receiving block's bottom surface and is detectable by touch.

4. The apparatus of claim 2, wherein the indicator is on the receiving block's top surface and is detectable visually as a color.

* * * * *